G. A. KALLENBERGER.
HUMIDOR.
APPLICATION FILED MAY 22, 1917.

1,254,603.

Patented Jan. 22, 1918.
2 SHEETS—SHEET 1.

WITNESS
C. F. Rudolph

INVENTOR
George A. Kallenberger,
BY Victor J. Evans
ATTORNEY

G. A. KALLENBERGER.
HUMIDOR.
APPLICATION FILED MAY 22, 1917.

1,254,603.

Patented Jan. 22, 1918.
2 SHEETS—SHEET 2.

WITNESS
C. F. Rudolph

INVENTOR
George A. Kallenberger,
BY Victor J. Evans
ATTORNEY

UNITED STATES PATENT OFFICE.

GEORGE A. KALLENBERGER, OF NEWARK, NEW JERSEY.

HUMIDOR.

1,254,603.

Specification of Letters Patent. Patented Jan. 22, 1918.

Application filed May 22, 1917. Serial No. 170,234.

*To all whom it may concern:*

Be it known that I, GEORGE A. KALLENBERGER, a citizen of the United States, residing at Newark, in the county of Essex and State of New Jersey, have invented new and useful Improvements in Humidors, of which the following is a specification.

This invention relates to humidors and has for one of its objects the provision of a moistening device which may be used to convert an ordinary cigar box or other receptacle for cigars and tobacco into an efficient humidor.

Another object of the invention resides in the provision of a simple and efficient attachment which may be easily and quickly secured to a container and which will carry a moistening pad or sponge to supply moisture to the container.

The invention also aims to generally improve devices of this nature to render them more practical, useful, and commercially desirable.

With these and other objects in view as will become more apparent as the description proceeds, the invention consists in certain novel features of construction, combination and arrangement of parts as will be hereinafter fully described, illustrated and claimed.

Figure 1:
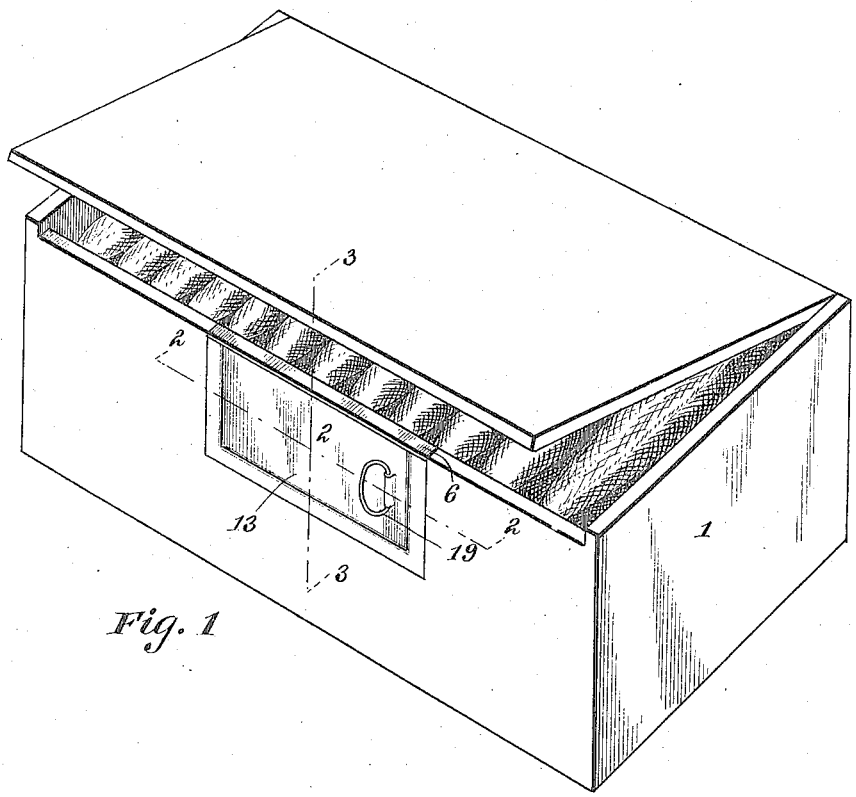
Figure 1 is a perspective view showing a humidor complete.
Figure 2:
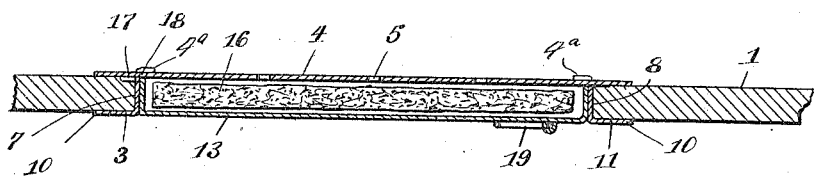
Fig. 2 is a horizontal sectional view on the plane of line 2—2 of Fig. 1.
Figure 3:
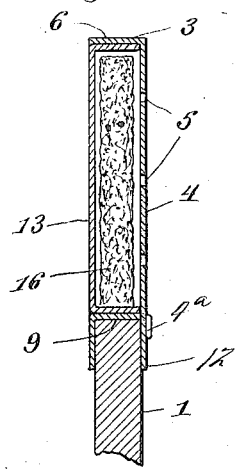
Fig. 3 is a transverse sectional view on the plane of line 3—3 of Fig. 1.
Figure 4:
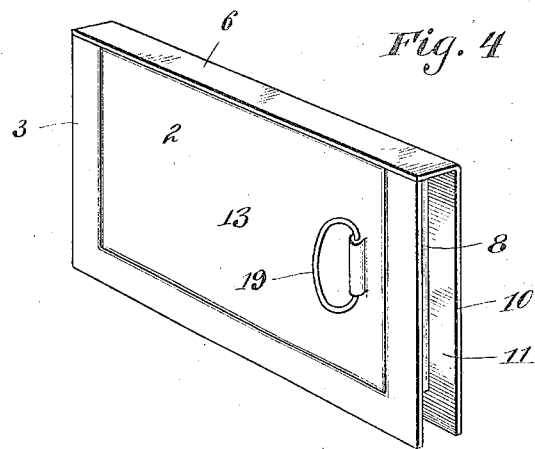
Fig. 4 is a perspective view of the humidor attachment removed from the container.
Figure 5:
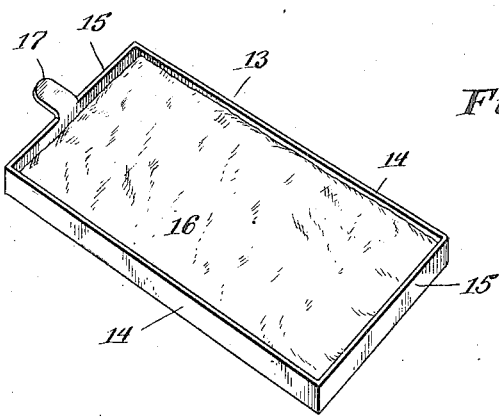
Fig. 5 is a perspective view of the pan for the moistening pad.

Referring in detail to the drawings by numerals, 1 designates as an entirety, a box or receptacle to which my improved humidor attachment generally designated 2 is secured. The box or receptacle may be of any size and material and the ordinary cigar box may be used to good advantage.

The humidor or moistening attachment which may be placed at any convenient point in the box, includes a shallow pan like body or casing 3, having an inner side wall 4, which is formed along one edge with an angular flange to provide a top wall 6. The side wall 4 is formed with a plurality of openings 5, through which moisture is adapted to pass from the receptacle into the box, as will be later apparent. The pan is formed by securing to the side wall 4 a U-shaped frame, the cross section of which is L-shaped and provides side walls 7 and 8, and a bottom wall 9, which coöperates with the extended portions of the side wall 4 to form end channels 11 and a bottom channel 12, the extended portions of the end wall 4 and parallel portions of the U-shaped frame providing flanges 10, which define these channels. The top wall 6 projects beyond the end walls 7 and 8 and closes the channels 11 at their upper ends.

One side of the receptacle or box 1 may be cut away adjacent its upper edge at any suitable place, to receive and hold the moistening attachment. The attachment may be then slid into position, the channels 11 engaging the side walls of the cut away portion of the box, while the channel 12 engages the bottom wall of the said cut away portion to securely hold the moistening attachment in position. The U-shaped frame is secured to the side wall 4, through the medium of tongues 4ª, which are carried by the said frame, and are adapted to be inserted through slots in the end wall and bent over in the well known manner for the purpose of securing the parts in position, there being preferably one of these tongues for each of the side walls 7 and 8 and the bottom wall 9.

A pan 13 having side walls 14 and end walls 15 is removably fitted into the body 3 through the outer open side thereof and contains a moistening pad 16. The walls of the pan are slightly resilient so as to clamp the pan in position and as a further means of securement, I provide one of the end walls 15 with a tongue 17 which may be inserted through an opening 18 in the end wall 7 of the body 3 to engage the inner side of the box 1. A ring 19 is connected to the pan so that the latter may be easily removed from the body of the humidor to permit the moistening of the pad.

It will be seen that my moistening or humidor attachment is adapted for use with various receptacles and when attached thereto as shown will supply moisture to the interior thereof. The attachment is simple, inexpensive to manufacture, and very desirable. It will be frictionally held in place on the receptacle 1 by the apertured wall and will be positively locked in position by the cover of the receptacle when closed.

While I have shown and described the preferred embodiments of my invention, it will be clearly understood that I do not wish to be limited to this construction, but may make such changes as will fall within the scope and spirit of the invention as claimed.

What I claim is:—

1. A humidor attachment comprising a body having a perforated side wall, top, bottom and end walls, channels formed in the ends and bottom of said body, the top wall extending over said end channels, and means for holding a moistening pad in said body.

2. A humidor attachment comprising a body, a perforated side wall, top, bottom and end walls, the end and bottom walls being spaced inwardly from the corresponding edges of the side wall, flanges formed on the end and bottom walls, the top wall projecting beyond the end walls, and means for removably holding a moistening pad in said attachment.

3. The combination with a receptacle having a side wall formed with an edge opening recess, of a humidor attachment comprising a body formed with edge opening channels, the body being positioned in said recess and the wall around said recess being received in said channels, a pan removably fitted into said body and a tongue formed on one end of said pan, said tongue being adapted to engage the inner side of the receptacle wall.

In testimony whereof I affix my signature.

GEORGE A. KALLENBERGER.

Copies of this patent may be obtained for five cents each, by addressing the "Commissioner of Patents, Washington, D. C."